United States Patent
Miyahara

(10) Patent No.: US 12,165,307 B2
(45) Date of Patent: Dec. 10, 2024

(54) IMAGE FORMING APPARATUS AND IMAGE FORMING SYSTEM FOR EXECUTING LAYOUT PROCESSING

(71) Applicant: CANON KABUSHIKI KAISHA, Tokyo (JP)

(72) Inventor: Nobuaki Miyahara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/710,216

(22) Filed: Mar. 31, 2022

(65) Prior Publication Data
US 2022/0327677 A1 Oct. 13, 2022

(30) Foreign Application Priority Data
Apr. 9, 2021 (JP) .................. 2021-066689

(51) Int. Cl.
- *G06T 7/00* (2017.01)
- *G06F 3/12* (2006.01)
- *G06K 15/02* (2006.01)
- *G06T 7/73* (2017.01)

(52) U.S. Cl.
CPC ............ *G06T 7/001* (2013.01); *G06F 3/1242* (2013.01); *G06F 3/125* (2013.01); *G06K 15/027* (2013.01); *G06K 15/1885* (2013.01); *G06T 7/74* (2017.01); *G06T 2207/30144* (2013.01)

(58) Field of Classification Search
CPC ... G06T 7/001; G06T 7/74; G06T 7/30; G06F 3/1242; G06F 3/125; G06K 15/1885
USPC ....... 358/1.15, 1.18, 1.2, 2.1, 1.12; 382/286, 382/289, 296, 298; 271/226
See application file for complete search history.

(56) References Cited

U.S. PATENT DOCUMENTS

| | | | | |
|---|---|---|---|---|
| 2004/0207859 A1* | 10/2004 | Kadoi | .............. | H04N 1/3873 715/251 |
| 2005/0207740 A1* | 9/2005 | Fukushima | ........ | H04N 1/00087 386/230 |
| 2006/0039020 A1* | 2/2006 | Sasaki | ............... | H04N 1/00278 358/1.13 |

(Continued)

FOREIGN PATENT DOCUMENTS

| | | |
|---|---|---|
| CN | 102411293 A | 4/2012 |
| JP | 2007088672 A | 4/2007 |

(Continued)

OTHER PUBLICATIONS

Lin Sheng; "Methods and techniques for printing graphics based on AutoCAD software"; Light Industry Science and Technology, vol. 9, No. 178; Sep. 14, 2013.

*Primary Examiner* — Jamares Q Washington
(74) *Attorney, Agent, or Firm* — Canon U.S.A., Inc. IP Division

(57) ABSTRACT

An image forming apparatus includes a printer configured to print image data on a printing medium, a storage, and a controller configured to compare reference image data with an image printed on the printing medium, wherein the controller is configured to execute layout processing of the image data on the printing medium based on a size of the printing medium and an image size of the image data, calculate offset information in the layout processing of the image data on the printing medium, and store the image data of which the layout processing is executed and the offset information in the storage.

19 Claims, 12 Drawing Sheets

(56) References Cited

U.S. PATENT DOCUMENTS

| | | | | |
|---|---|---|---|---|
| 2012/0081718 A1* | 4/2012 | Soriano | ............... | G06F 3/125 |
| | | | | 358/1.9 |
| 2013/0114102 A1* | 5/2013 | Yamamoto | ........... | G06V 10/245 |
| | | | | 358/1.14 |
| 2017/0277099 A1* | 9/2017 | Miyazaki | ........... | G03G 15/6517 |
| 2019/0158683 A1* | 5/2019 | Aizawa | ............. | H04N 1/00063 |
| 2019/0212955 A1 | 7/2019 | Gutierrez et al. | | |

FOREIGN PATENT DOCUMENTS

| | | | |
|---|---|---|---|
| JP | 2018187844 A | 11/2018 | |
| JP | 2019095476 A | 6/2019 | |

\* cited by examiner

IMAGE FORMING APPARATUS AND IMAGE FORMING SYSTEM FOR EXECUTING LAYOUT PROCESSING

BACKGROUND

Field of the Disclosure

The present disclosure relates to an image forming apparatus and an image forming system.

Description of the Related Art

Printing systems in which sheets printed by a printing apparatus can be inspected by an inspection apparatus during conveyance has been known in recent years. In inspecting printed sheets, the inspection apparatus initially reads an image of a conveyed printed sheet and registers the read image as a reference image. The inspection apparatus then analyzes images of output products (printed sheets) of an executed print job and compares the images with the reference image to determine whether the printed sheets are normal. The inspection apparatus can detect by the inspection a missing line in a barcode or ruled lines, a missing image, printing stain, a missing page, and a color drift, for example.

Some inspection systems are configured to print images to be inspected in advance and register the images read by an inspection apparatus in the inspection apparatus as reference images. However, since the inspection systems having such a configuration read printed sheets in registering the reference images, an operator needs to visually check whether the printed output sheets or the read images are appropriate for reference images. The greater the number of pages, the greater the amount of the operator's check operations. As a result, the check operations can take long and there can occur operation errors. In view of this, an inspection system configured so that the amounts of adjustments made to raster data in image processing are compensated for during raster image processor (RIP) image inspection, and the obtained image data is set in an inspection apparatus as reference images has been known (Japanese Patent Application Laid-Open No. 2019-95476).

However, input images of a print job do not necessarily have the same size as the sheet size.

For example, with the printing margins of the printing apparatus taken into account, some jobs are configured so that input images do not include marginal portions. Some print jobs are configured to print image data on sheets having a size different from that of the image data. If the image data of such a print job is registered in the inspection apparatus as reference images, images read by the inspection apparatus during printing do not match the reference images in size since the read images have the same size as the sheet size. Inspection results can thus be abnormal due to the misalignment of the inspection position.

SUMMARY

According to embodiments of the present disclosure, an image forming apparatus includes a printer configured to print image data on a printing medium, a storage, and a controller configured to compare reference image data with an image printed on the printing medium, wherein the controller is configured to execute layout processing of the image data on the printing medium based on a size of the printing medium and an image size of the image data, calculate offset information in the layout processing of the image data on the printing medium, and store the image data of which the layout processing is executed and the offset information in the storage.

Further features of the present disclosure will become apparent from the following description of exemplary embodiments with reference to the attached drawings.

DESCRIPTION OF THE EMBODIMENTS

Exemplary embodiments of the present disclosure will be described in detail with reference to the attached drawings. The following exemplary embodiments are not intended to limit the disclosure, and all combinations of features described in the exemplary embodiments are not necessarily indispensable to the solving means of embodiments of the present disclosure. An external controller according to the exemplary embodiments may be referred to as an image processing controller, a digital front end (DFE), or a print server. An image forming apparatus may be referred to as a multifunction peripheral (MFP).

Figure 1:
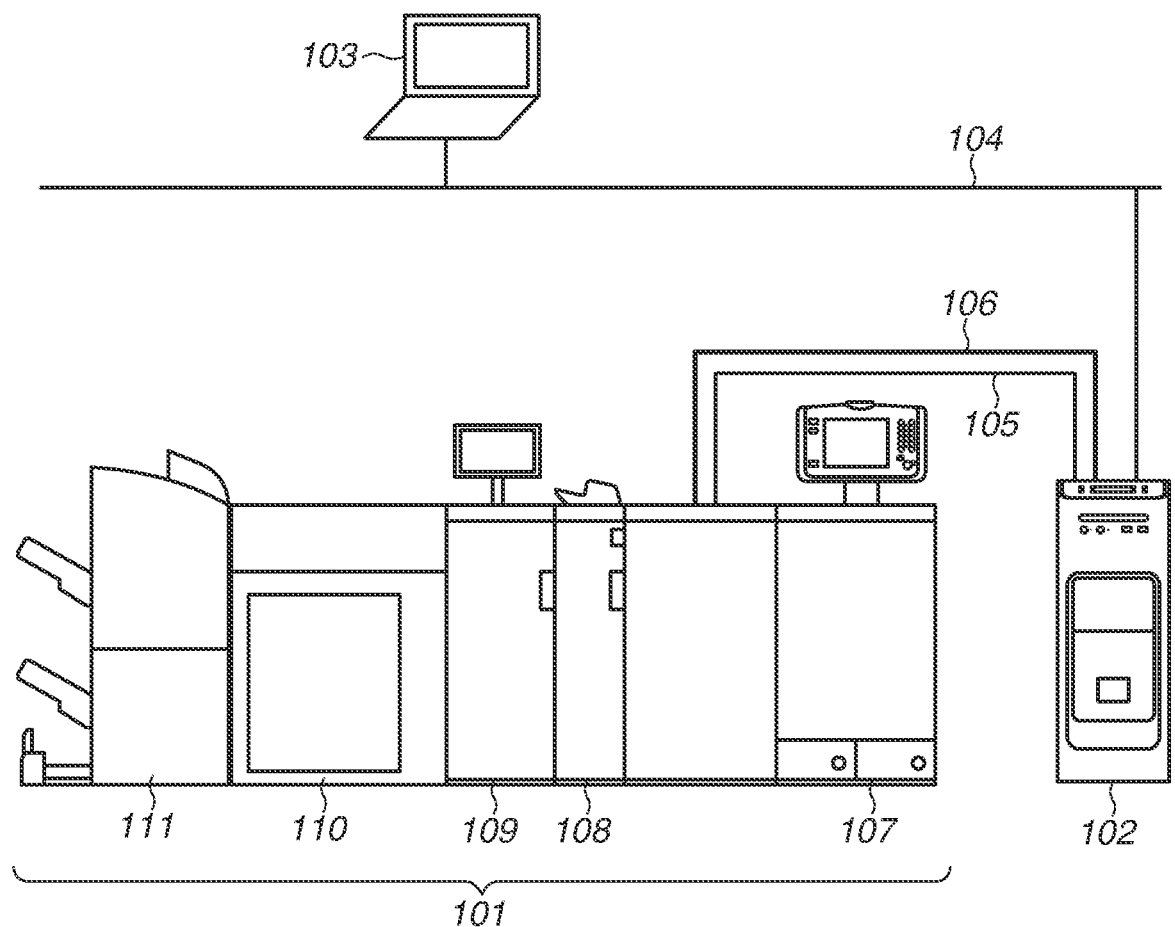
FIG. 1 is an overall view of a hardware configuration of an image forming system.

FIG. 1 is an overall view of a hardware configuration of an image forming system according to a first exemplary embodiment. The image forming system includes an image forming apparatus 101 and an external controller 102. The image forming apparatus 101 and the external controller 102 are communicably connected via an internal local area network (LAN) 105 and a video cable 106. The external controller 102 is communicably connected to a personal computer (PC) 103 via an external LAN 104. Print instructions are given from the PC 103 to the external controller 102.

A printer driver having a function of converting print data into a print description language processable by the external controller 102 is installed on the PC 103. A user who performs printing can issue print instructions from various applications via the printer driver. The printer driver transmits print data to the external controller 102 based on the print instructions from the user. Receiving the print instructions from the PC 103, the external controller 102 performs data analysis and rasterization processing, and submits the print data and gives print instructions to the image forming apparatus 101. The external controller 102 submits the print data to the image forming apparatus 101 via the internal LAN 105, and submits rasterized image data via the video cable 106.

Next, the image forming apparatus 101 will be described. The image forming apparatus 101 includes a plurality of apparatuses having different functions, which is connected and configured to enable complicated print processing such as bookbinding.

A printing apparatus 107 forms an image on a sheet conveyed from a sheet feed unit located in a lower part of the printing apparatus 107 using toner. While the following description will be given by using a sheet as an example, any printing medium other than a sheet of paper may also be used.

A configuration and operation principles of the printing apparatus 107 will be described. A photosensitive drum is irradiated with a light beam, such as laser light, modulated based on image data and reflected by a rotating polygon mirror as scanning light.

An electrostatic latent image formed on the photosensitive drum by the laser light is developed with toner, and a developed toner image is transferred to a sheet via a transfer belt. Such a series of image formation processes is performed with yellow (Y), magenta (M), cyan (C), and black (K) toners in succession to form a full-color image on the sheet. The sheet on which the full-color image is formed is conveyed to a fixing device. The fixing device includes a roller and a belt. The roller includes a built-in heat source such as a halogen heater, and the toner on the sheet to which toner images are transferred is melted and fixed to the sheet by heat and pressure. An inserter 108 is an apparatus for inserting an insertion sheet. The inserter 108 can insert the insertion sheet into a group of sheets printed and conveyed by the printing apparatus 107 at a given position.

An inspection apparatus 109 is an apparatus for determining whether printed images are normal by reading the images on the conveyed sheets (print products) and comparing the generated image data with reference image data registered in advance. After the determination, print products determined to be normal and ones determined to be erroneous are discharged separately, for example.

A large-capacity stacker 110 is an apparatus capable of stacking a large volume of sheets. A finisher 111 is an apparatus for applying finishing processing to conveyed sheets. The finisher 111 can perform the finishing processing such as stapling, punching, and saddle stitching depending on settings, and discharge the resulting product to a discharge tray.

The image forming system described with reference to FIG. 1 is configured so that the external controller 102 is connected to the image forming apparatus 101. However, the present disclosure is not limited to the configuration with the external controller 102 connected.

More specifically, the image forming apparatus 101 may be connected to the external LAN 104, and the PC 103 may transmit print data processable by the image forming apparatus 101. In such a configuration, the image forming apparatus 101 performs the data analysis and the rasterization processing, and executes the print processing.

Figure 2:
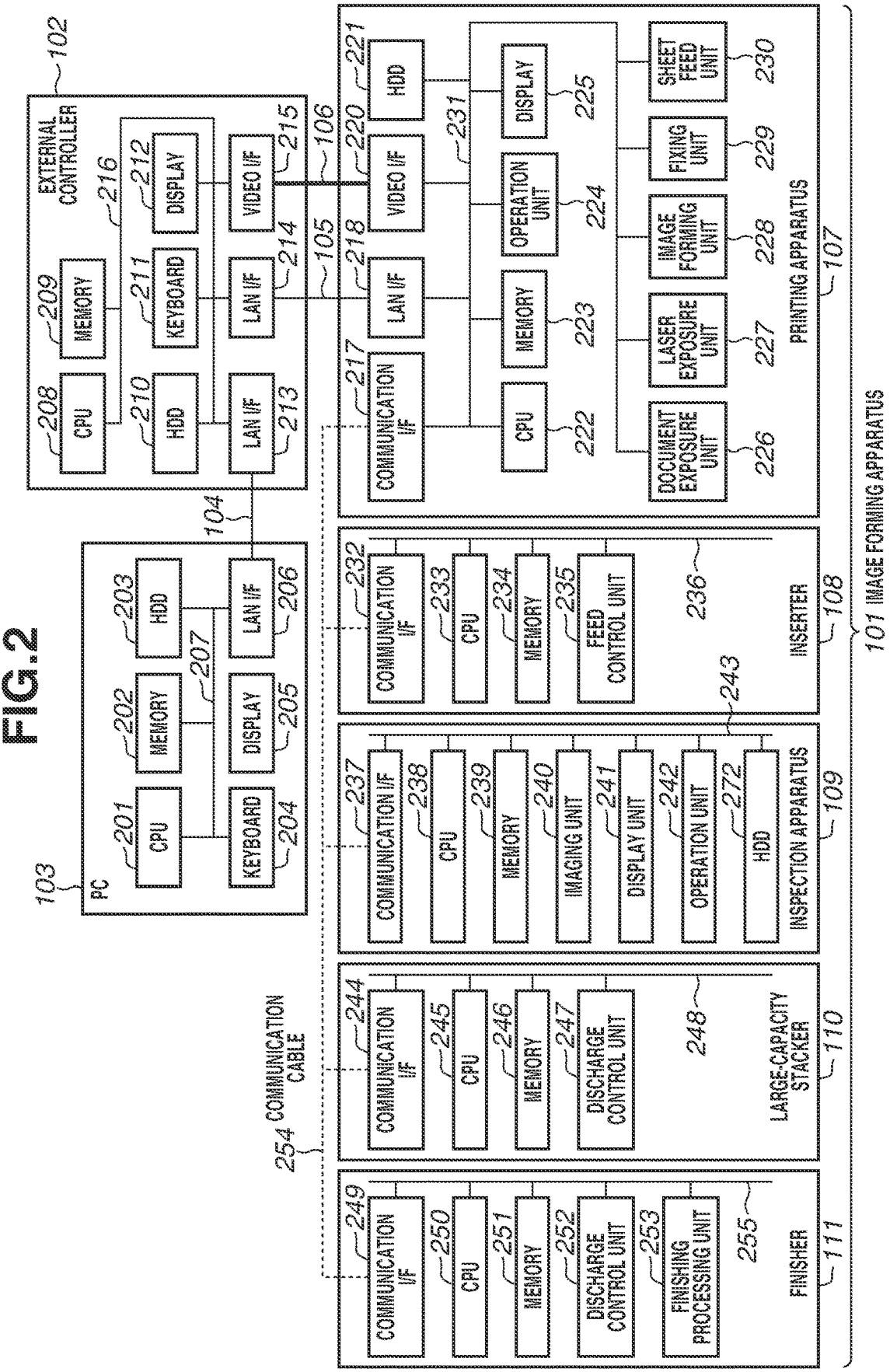
FIG. 2 is a block diagram illustrating a system configuration of the image forming system.

FIG. 2 is a block diagram illustrating a system configuration of the image forming apparatus 101, the external controller 102, and the PC 103.

First, a configuration of the printing apparatus 107 of the image forming apparatus 101 will be described. The printing apparatus 107 of the image forming apparatus 101 includes a communication interface (I/F) 217, a LAN I/F 218, a video I/F 220, a hard disk drive (HDD) 221, a central processing unit (CPU) 222, a memory 223, an operation unit 224, and a display 225. The printing apparatus 107 of the image forming apparatus 101 further includes a document exposure unit 226, a laser exposure unit 227, an image forming unit 228, a fixing unit 229, and a sheet feed unit 230. The components are connected via a system bus 231.

The communication I/F 217 is connected to the inserter 108, the inspection apparatus 109, the large-capacity stacker 110, and the finisher 111 via a communication cable 254, and performs communication for controlling the apparatuses.

The LAN I/F 218 is connected to the external controller 102 via the internal LAN 105 and communicates print data.

The video I/F 220 is connected to the external controller 102 via the video cable 106 and communicates rasterized image data.

The HDD 221 is a storage device storing programs and data. The CPU 222 comprehensively controls image processing and printing based on the programs and the like stored in the HDD 221. The memory 223 stores programs that the CPU 222 uses in performing various types of processing as well as image data, and functions as a work area.

The operation unit 224 accepts various setting inputs and operation instructions from the user. The display 225 displays setting information about the image forming apparatus 101 and a processing status of a print job.

The document exposure unit 226 performs processing for reading a document in using a copy function or a scan function. The document exposure unit 226 reads document data by illuminating a sheet set by the user with an exposure lamp and capturing an image using a charge-coupled device (CCD) camera.

The laser exposure unit 227 is a device for performing primary charging and laser exposure for irradiating the photosensitive drums with laser light to form electrostatic latent images. First, the laser exposure unit 227 performs primary charging to charge the surfaces of the photosensitive drums to a uniform negative potential. Next, the laser exposure unit 227 irradiates the photosensitive drums with laser light using a laser driver while adjusting reflection angles using the polygon mirror. Negative charges at the irradiated portions are thereby neutralized to form the electrostatic latent images. The image forming unit 228 is a device for transferring toner to a sheet. The image forming unit 228 includes developing units, transfer units, and toner replenishment units, and transfers toner on the photosensitive drums to the sheet via the transfer belt.

In the developing units, developing cylinders make negatively charged toner adhere to the electrostatic latent images on the surfaces of the photosensitive drums and thereby visualize the electrostatic latent images. The transfer units perform primary transfer and secondary transfer. In the primary transfer, a positive potential is applied to primary transfer rollers, and the toner on the surfaces of the photosensitive drums is transferred to the transfer belt. In the secondary transfer, a positive potential is applied to a secondary transfer outer roller to transfer the toner on the transfer belt to the sheet. The fixing unit 229 is a device for melting the toner on the sheet and fixing the toner to the sheet by heat and pressure. The fixing unit 229 includes a heating roller and a pressure roller. The sheet feed unit 230 is a device for feeding sheets. Sheet feed operations and conveyance operations are controlled by using rollers and various sensors.

Next, a configuration of the inserter 108 of the image forming apparatus 101 will be described. The inserter 108 of the image forming apparatus 101 includes a communication I/F 232, a CPU 233, a memory 234, and a feed control unit 235. The components are connected via a system bus 236. The communication I/F 232 is connected to the printing apparatus 107 via the communication cable 254 and performs control communication. The CPU 233 performs various controls for feeding sheets based on a control program stored in the memory 234. The memory 234 is a storage device storing the control program. The feed control unit 235 controls rollers and sensors while controlling feeding and conveyance of sheets conveyed from a sheet feed unit of the inserter 108 and from the printing apparatus 107 based on instructions from the CPU 222.

Then, a configuration of the inspection apparatus 109 of the image forming apparatus 101 will be described. The inspection apparatus 109 of the image forming apparatus 101 includes a communication I/F 237, a CPU 238, a memory 239, an imaging unit 240, a display unit 241, an operation unit 242, and an HDD 272. The components are connected via a system bus 243. The communication I/F 237 is connected to the printing apparatus 107 via the communication cable 254 and performs control communication.

The communication cable 254 and the communication I/F 237 are also used to receive reference images to be used for inspection from the printing apparatus 107. The received reference images are stored in the HDD 272. The CPU 238 performs various types of control for inspection based on a control program stored in the memory 239. The memory 239 is a storage device storing the control program.

The imaging unit 240 captures images of a conveyed sheet based on instructions from the CPU 238. The CPU 238 compares the images captured by the imaging unit 240 with the reference images stored in the HDD 272, and determines whether the printed images are normal. The display unit 241 displays an inspection result and a setting screen. The operation unit 242 is operated by the user and accepts instructions to change the settings of the inspection apparatus 109 and register reference images. The HDD 272 stores the reference images.

If the inspection apparatus 109 does not include the HDD 272, the reference images may be stored in the HDD 221. The inspection apparatus 109 may be configured to read the reference images from the HDD 221 into the memory 239 and use the reference images in performing the processing for determining whether the printed images are normal.

Then, a configuration of the large-capacity stacker 110 of the image forming apparatus 101 will be described. The large-capacity stacker 110 of the image forming apparatus 101 includes a communication I/F 244, a CPU 245, a memory 246, and a discharge control unit 247. The components are connected via a system bus 248. The communication I/F 244 is connected to the printing apparatus 107 via the communication cable 254 and performs control communication. The CPU 245 performs various types of control for sheet discharge based on a control program stored in the memory 246. The memory 246 is a storage device storing the control program. The discharge control unit 247 controls conveyance of conveyed sheets to a stack tray, an escape tray, and the finisher 111 at the subsequent stage based on instructions from the CPU 245.

Then, a configuration of the finisher 111 of the image forming apparatus 101 will be described. The finisher 111 of the image forming apparatus 101 includes a communication I/F 249, a CPU 250, a memory 251, a discharge control unit 252, and a finishing processing unit 253. The components are connected via a system bus 255. The communication I/F 249 is connected to the printing apparatus 107 via the communication cable 254 and performs control communication. The CPU 250 performs various types of control for finishing and sheet discharge based on a control program stored in the memory 251. The memory 251 is a storage device storing the control program. The discharge control unit 252 controls conveyance and discharge of sheets based on instructions from the CPU 250. The finishing processing unit 253 controls finishing processing, such as stapling, punching, and saddle stitching, based on instructions from the CPU 250.

Then, a configuration of the external controller 102 will be described. The external controller 102 includes a CPU 208, a memory 209, an HDD 210, a keyboard 211, a display 212, a LAN I/F 213, a LAN I/F 214, and a video I/F 215, which are connected via a system bus 216. The CPU 208 comprehensively performs processing such as reception of print data from the PC 103, raster image processor (RIP) processing, and transmission of print data to the image forming apparatus 101 based on programs and data stored in the HDD 210.

The memory 209 stores the programs and data that the CPU 208 uses in performing various types of processing, and functions as a work area. The HDD 210 stores programs and data to be used for print processing and other operations. The keyboard 211 is a device for inputting operation instructions for the external controller 102. The display 212 displays information about an application running on the external controller 102 using a still or moving image video signal. The LAN I/F 213 is connected to the PC 103 via the external LAN 104 and communicates print instructions. The LAN I/F 214 is connected to the image forming apparatus 101 via the internal LAN 105 and communicates print data as the print instructions. The video IF 215 is connected to the image forming apparatus 101 via the video cable 106 and communicates rasterized image data.

Then, a configuration of the PC 103 will be described. The PC 103 includes a CPU 201, a memory 202, an HDD 203, a keyboard 204, a display 205, and a LAN I/F 206, which are connected via a system bus 207. The CPU 201 generates print data and executes a print instruction based on a document processing program stored in the HDD 203.

The CPU 201 also comprehensively controls the devices connected to the system bus 207. The memory 202 stores programs and data that the CPU 201 uses in performing various types of processing, and functions as a work area. The HDD 203 stores programs and data to be used for print processing and other operations. The keyboard 204 is a device for inputting operation instructions for the PC 103. The display 205 displays information about applications running on the PC 103 using a still or moving image video signal. The LAN I/F 206 is connected to the external LAN 104 and communicates print instructions.

In the foregoing description, the external controller 102 and the image forming apparatus 101 are connected by the internal LAN 105 and the video cable 106. However, the external controller 102 and the image forming apparatus 101 may be configured to be connected by only the video cable 106 as long as data for printing can be transmitted and received. Each of the memories 202, 209, 223, 234, 239, 246, and 251 may be any storage device for storing data and programs. For example, each of the memories 202, 209, 223, 234, 239, 246, and 251 may be replaced with a volatile random access memory (RAM), a nonvolatile ROM, a built-in HDD, an external HDD, or a Universal Serial Bus (USB) memory.

Figure 3:
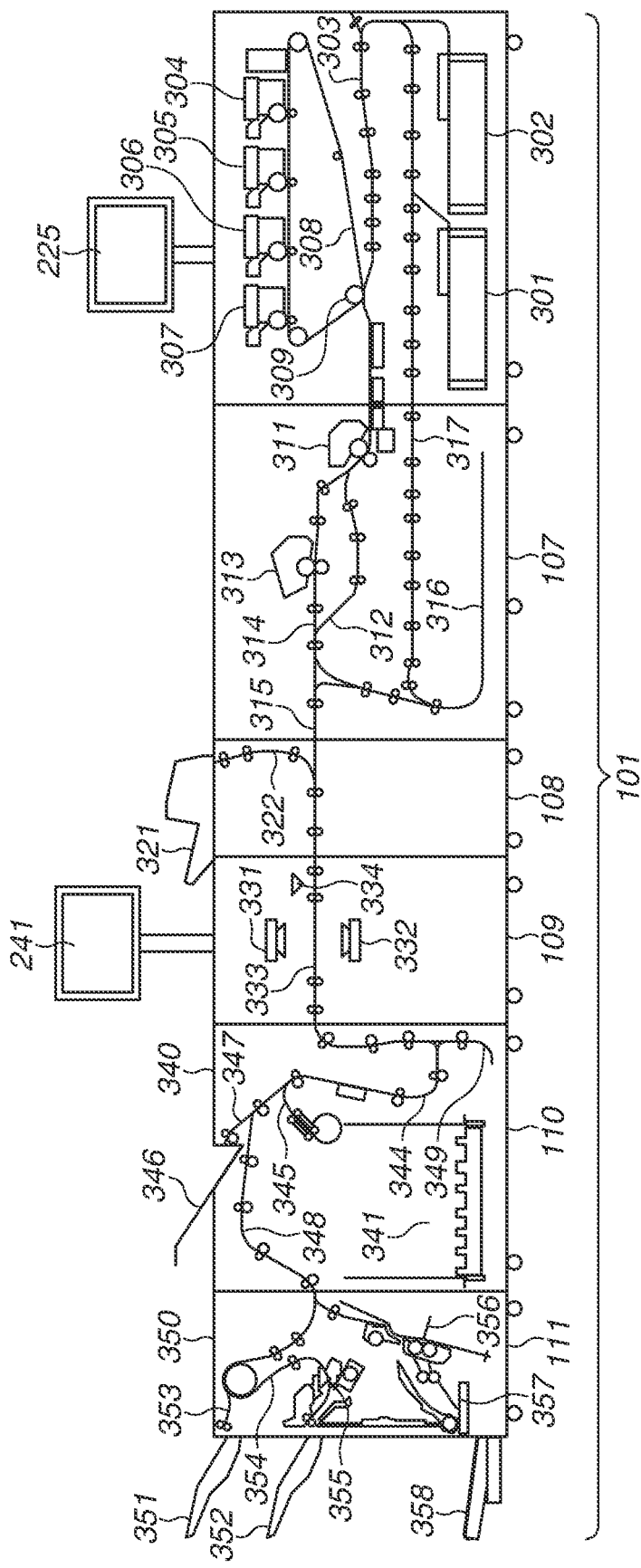
FIG. 3 is a schematic diagram illustrating a mechanical sectional view of an image forming apparatus.

FIG. 3 is a mechanical sectional view of the image forming apparatus 101. The printing apparatus 107 prints formed images on sheets. A sheet feed deck 301 and a sheet feed deck 302 can store various types of sheets. Information (sheet size and sheet type) about sheets stored in each of the sheet feed decks 301 and 302 can be set from the operation unit 224 of the printing apparatus 107.

Each of the sheet feed decks 301 and 302 can separate only the topmost one of the stored sheets and convey the sheet to a sheet conveyance path 303. To form a color image, developing stations 304, 305, 306, and 307 form toner images using Y, M, C, and K color toners, respectively. The toner images formed here are primarily transferred to a transfer belt 308. The transfer belt 308 rotates clockwise in the diagram, and the toner images are transferred to the sheet conveyed from the sheet conveyance path 303 at a secondary transfer position 309.

The display 225 displays a print status of the image forming apparatus 101 and information for setting. A fixing unit 311 fixes the toner images to the sheet. The fixing unit 311 includes a pressure roller and a heating roller, and melts and pressurizes the toner to fix the toner images to the sheet by passing the sheet between the rollers. The sheet past the fixing unit 311 is conveyed through a sheet conveyance path 312 to a sheet conveyance path 315.

Depending on the sheet type, additional melting and pressurization for fixing may be desirable. In such a case, the sheet past the fixing unit 311 is conveyed to a second fixing unit 313 through an upper sheet conveyance path. The second fixing unit 313 applies the additional melting and pressurization, and then the sheet is conveyed to the sheet conveyance path 315 through a sheet conveyance path 314. If an image formation mode is a two-sided mode, the sheet is conveyed to a sheet reversing path 316. The sheet is reversed using the sheet reversing path 316, conveyed to a two-sided conveyance path 317, and subjected to image transfer on the second side at the secondary transfer position 309.

The inserter 108 inserts an insertion sheet. The inserter 108 includes an inserter tray 321, and merges an insertion sheet fed to the inserter tray 321 into the conveyance path via a sheet conveyance path 322. Insertion sheets can thus be inserted into a series of sheets conveyed from the printing apparatus 107 at given positions, and can be conveyed to the subsequent apparatuses.

The sheet past the inserter 108 is conveyed to the inspection apparatus 109. The inspection apparatus 109 includes cameras 331 and 332 opposed to each other. The camera 331 is intended to read the front of the sheet, and the camera 332 is intended to read the back of the sheet. The inspection apparatus 109 can read the images of the sheet conveyed to a sheet conveyance path 333 using the cameras 331 and 332 at timing when the sheet reaches a predetermined position, and determine whether the images printed by the printing apparatus 107 are normal. The display unit 241 displays a result of the inspection performed by the inspection apparatus 109.

The large-capacity stacker 110 is a large-capacity stacker on which a large volume of sheets can be stacked.

The large-capacity stacker 110 includes a stack tray 341 as a tray on which sheets determined to be normal sheets (print products) by the inspection apparatus 109 are stacked. The sheet past the inspection apparatus 109 enters the large-capacity stacker 110 through a sheet conveyance path 344. If the sheet is a normal one, the sheet from the sheet conveyance path 344 is passed through a sheet conveyance path 345 and stacked on the stack tray 341.

The large-capacity stacker 110 further includes an escape tray 346 as a discharge tray. The escape tray 346 is a discharge tray used to discharge sheets determined to be erroneous sheets (print products) by the inspection apparatus 109. In outputting a sheet to the escape tray 346, the sheet is conveyed from the sheet conveyance path 344 to the escape tray 346 via a sheet conveyance path 347. In conveying a sheet to the post-processing apparatus (finisher 111) at the subsequent stage of the large-capacity stacker 110, the sheet is conveyed through a sheet conveyance path 348. A reversing section 349 reverses a sheet. The reversing section 349 is used in stacking the sheet on the stack tray 341.

If the sheet is to be stacked on the stack tray 341, the sheet is once reversed using the reversing section 349 so that the sheet is output in the same orientation as when input. If the sheet is to be conveyed to the escape tray 346 or to the subsequent post-processing apparatus, the reversing operation using the reversing section 349 is not performed since the sheet is simply discharged without being flipped upon stacking.

The finisher 111 is an apparatus for applying finishing processing to the conveyed sheets based on the user-specified function. Specifically, the finisher 111 has finishing functions such as stapling (single stapling and double stapling), punching (two-hole punching and three-hole punching), and saddle stitching. The finisher 111 includes a discharge tray 351 and a discharge tray 352. Sheets are output to the discharge tray 351 through a sheet conveyance path 353. No finishing processing is available on the sheet conveyance path 353.

To perform the finishing processing such as stapling, sheets are conveyed to a processing unit 355 via a sheet conveyance path 354. In the processing unit 355, the user-specified finishing function is performed on the sheets, and the resulting sheets are output to the discharge tray 352. Each of the discharge trays 351 and 352 can be lifted up and down. The discharge tray 351 can be lowered so that sheets subjected to the finishing processing by the processing unit 355 can be stacked thereon. If the saddle stitching is specified, a saddle stitch processing unit 356 staples sheets in the center, folds the sheets in two, and outputs the sheets to a saddle stitching tray 358 via a sheet conveyance path 357. The saddle stitching tray 358 has a belt conveyor configuration so that saddle-stitched bundles stacked on the saddle stitching tray 358 are conveyed to the left.

Figure 4:
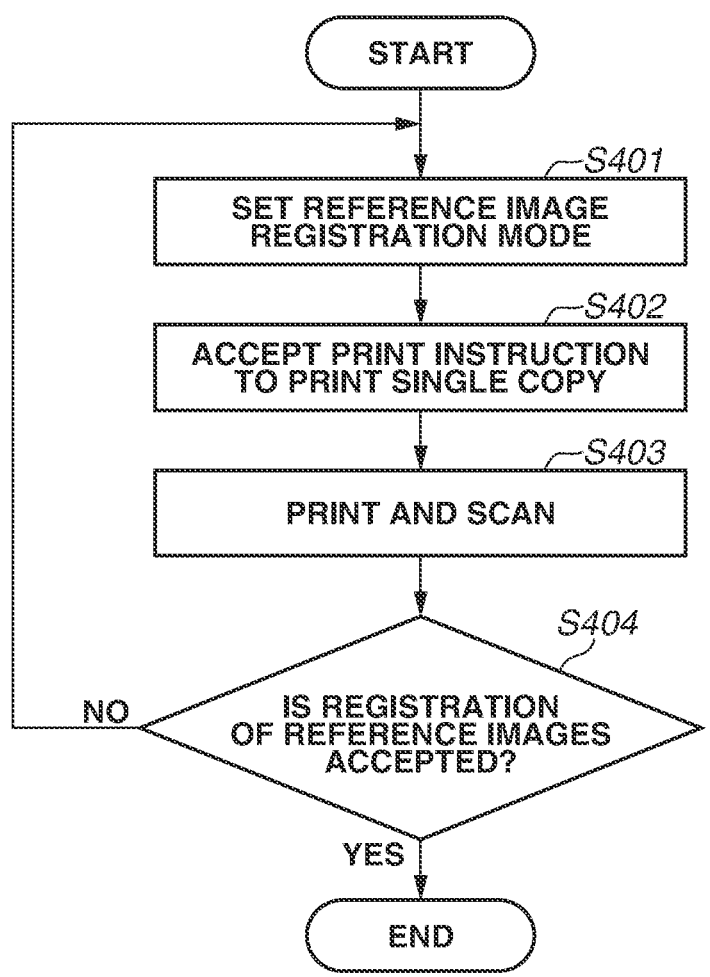
FIG. 4 is a flowchart illustrating a conventional procedure for registering reference images.

FIG. 4 is a flowchart illustrating a conventional procedure for registering reference images.

Print products printed by the image forming apparatus 101 are inspected using the system configuration illustrated in FIG. 2. For inspection, reference images are registered in the HDD 272 of the inspection apparatus 109 in advance. During printing, images on a sheet are read using the cameras 331 and 332, and compared with the reference images to determine whether the images on the sheet are normal. The reference images have heretofore been registered by actually performing printing, reading the images on the sheet using the cameras 331 and 332, and registering the read images in the HDD 272 as the reference images.

In step S401, the operation unit 242 accepts the operator's mode setting of the inspection apparatus 109. The inspection apparatus 109 is thereby set to a reference image registration mode. In the conventional registration mode, the inspection apparatus 109 enters a standby state to wait for a sheet to be conveyed to the sheet conveyance path 333 since images on the sheet read by the cameras 331 and 332 are registered as reference images.

In step S402, the external controller 102 accepts a print instruction from the PC 103. The print instruction accepted here is to print a single copy of the print job that the operator wants to inspect.

In step S403, the printing apparatus 107 executes the print job and prints image data on a sheet. The inspection apparatus 109 reads the printed sheet using the cameras 331 and 332, and stores the read images in the HDD 272. The operator visually observes the output printed sheet or preview images displayed on the display unit 241, and determines whether the read images are appropriate as the reference images.

In step S404, if registration of the reference images is accepted (YES in step S404), the processing ends. On the other hand, if the registration of the reference images is not accepted (NO in step S404), the processing returns to step S401. Here, the operator cleans the image forming apparatus 101 and changes the settings of the print job so that read images can be registered as reference images. Steps S401 to S404 are repeated until the inspection apparatus 109 accepts the registration of the reference images.

Since the conventional registration of the reference images includes actually printing the print job and inputting the reference images by the same input method as that of inspection images, the image size and orientation do not need to be taken into account, and inspection can be made by a simple image comparison. However, if the print job includes a large number of pages, there are issues of possible check errors and a long time taken for checking since the operator visually determines whether all the pages are appropriate as the reference images.

Figure 5:
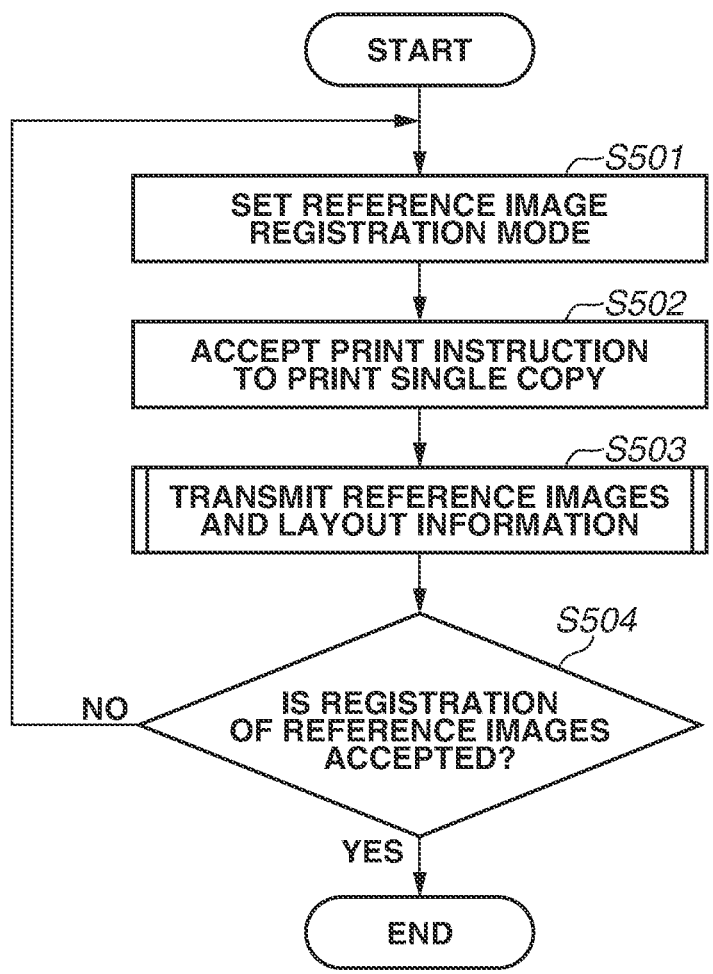
FIG. 5 is a flowchart illustrating a procedure for registering reference images according to an exemplary embodiment.

FIG. 5 is a flowchart illustrating a procedure for registering reference images according to the present exemplary embodiment.

In the present exemplary embodiment, reference images are registered not by reading a printed sheet as in FIG. 4 but by registering image data generated from rasterized image data (raster data). In the present exemplary embodiment, the rasterized image data will be described to be received from the external controller 102 via the video cable 106. However, this is not restrictive. For example, the image forming apparatus 101 may receive a print job (including page description language (PDL) data, for example) from the PC 103 and rasterize the image data.

In step S501, the operator makes settings from the operation unit 242 to set the inspection apparatus 109 to a reference image registration mode. Unlike the conventional registration mode, the printing apparatus 107 waits for input of rasterized image data from the external controller 102 via the video cable 106.

In step S502, the external controller 102 accepts a print instruction from the PC 103. The print instruction includes print settings including at least the size of a sheet to be printed, resolution, image orientation, and an image size of each page, and image data. The print instruction accepted here is to print a single copy of a print job that the operator wants to inspect. In the present exemplary embodiment, a print instruction is accepted to provide operability consistent with the conventional procedure for registering reference images. However, an instruction to register the print job as a reference image registration job may be accepted from the PC 103.

In step S503, the printing apparatus 107 determines a layout in which the image data input from the external controller 102 via the video cable 106 is printed on a sheet, and determines a rotation angle of an image and offsets from sheet edges based on the layout.

Figure 9:
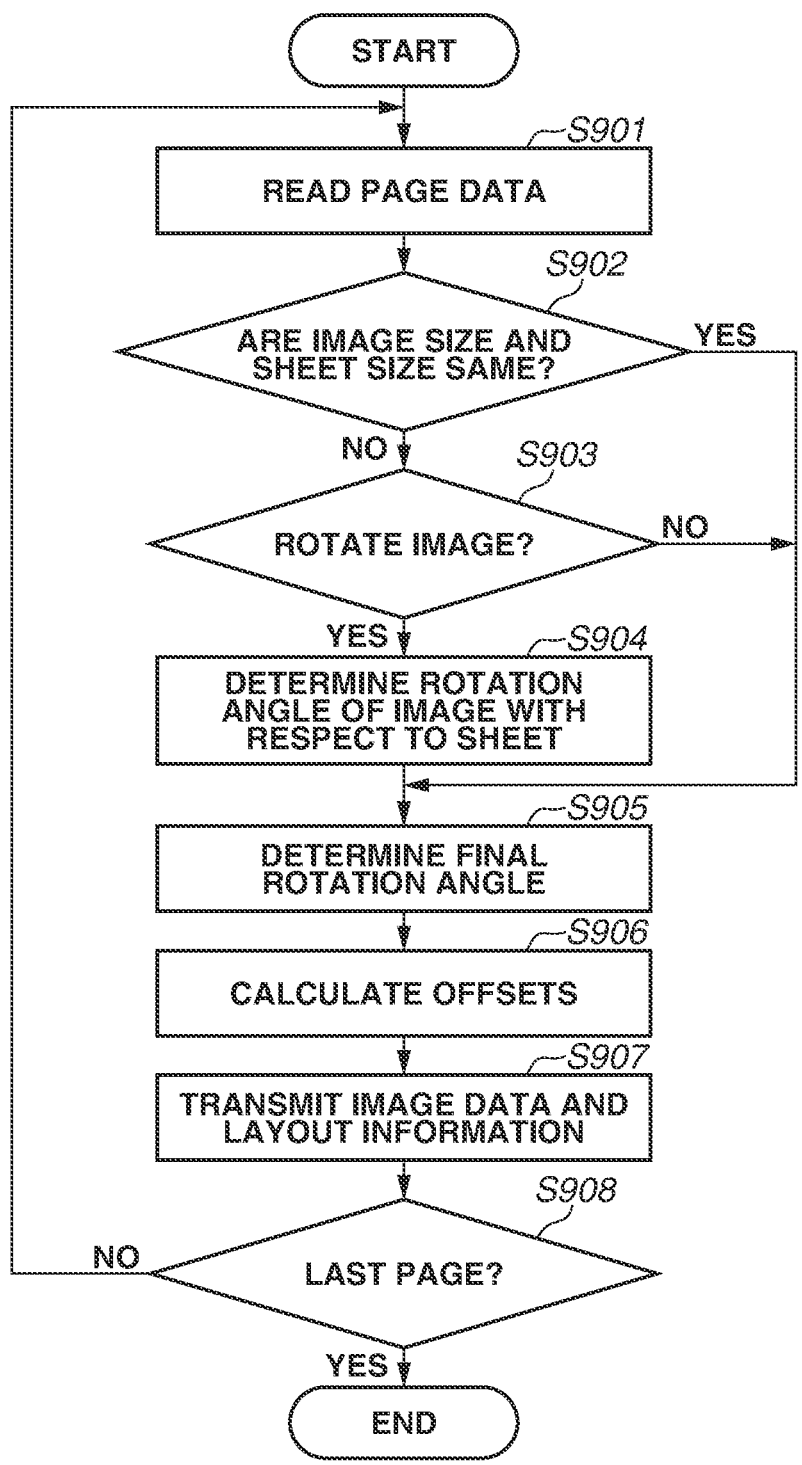
FIG. 9 is a flowchart illustrating a procedure for generating layout information and registering reference images.

Then, the printing apparatus 107 transmits the image data as the reference images to the inspection apparatus 109 via the communication cable 254, and transmits the calculated rotation angle of the image and offset information about the offsets from the sheet edges as layout information. Details of the processing of step S503 are illustrated in FIG. 9. The inspection apparatus 109 registers the image data in the memory 239 as the reference images along with the layout information.

In step S504, if registration of the reference images is accepted (YES in step S504), the processing ends with the reference images stored in the HDD 272 in step S503 maintained. On the other hand, if the registration of the reference images is not accepted (NO in step S504), the processing returns to S501 with the reference images stored in the HDD 272 deleted. Here, the operator changes the settings of the print job so that the input image data can be registered as the reference images. Steps S501 to S504 are repeated until the inspection apparatus 109 accepts the registration of reference images.

While, in step S503, the reference images are stored in the HDD 272, the reference images may be stored in the memory 239 instead. In such a case, the reference images stored in the memory 239 are stored in the HDD 272 if the registration of the reference images is accepted in step S504. If the registration of the reference images is not accepted in step S504, the reference images stored in the memory 239 are not stored in the HDD 272.

Then, details of the processing for generating and transferring the reference images in step S503 will be described with reference to FIGS. 6 to 10C. First, a relationship between image data to be printed on a sheet and margins will be described with reference to FIG. 6.

Figure 6:
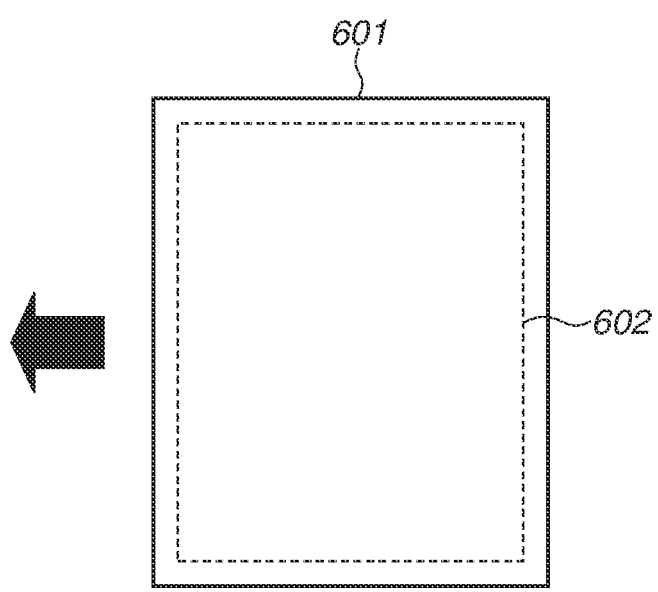
FIG. 6 is a diagram illustrating margins of a sheet printed by the image forming apparatus.

FIG. 6 is a diagram illustrating the margins of a sheet for printing by the image forming apparatus 101. A sheet 601 is one on which image data is to be printed, and conveyed in the direction of the arrow. An area inside a broken line 602 is where the image forming apparatus 101 actually prints an image, and an area outside the broken line 602 is where no image is printed. Thus, if image data as large as the sheet size of the sheet 601 is received from the external controller 102, an image in the area outside the broken line 602 will not be printed on the area.

In the present exemplary embodiment, all the top, bottom, left, and right margins have the same width. However, the top, bottom, left, and right margins can have difference widths if the printable areas at the leading edge and the trailing edge, or the far side and the near side, in the conveyance direction are different depending on the configuration of the image forming apparatus 101.

Figure 7A:
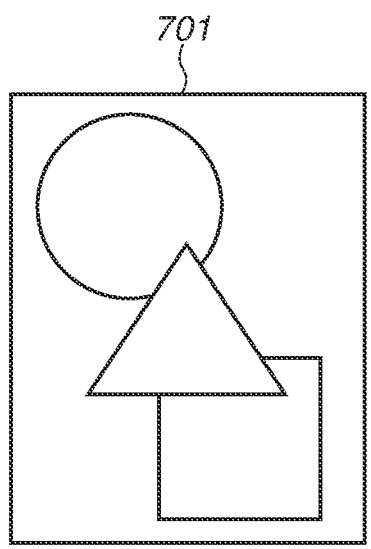
FIGS. 7A, 7B, and 7C are diagrams illustrating a relationship between a margin-deleted input image and a sheet size.
Figure 7B:
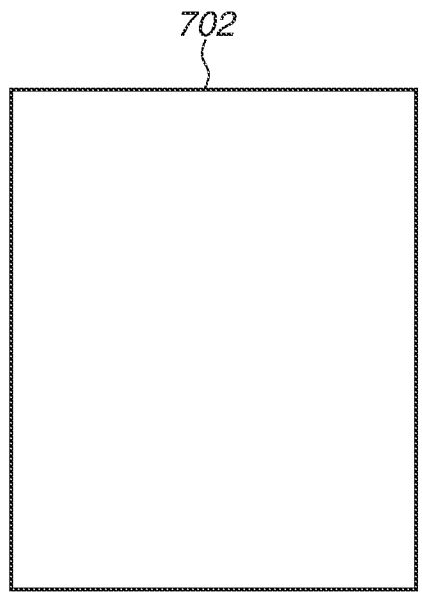
Figure 7C:
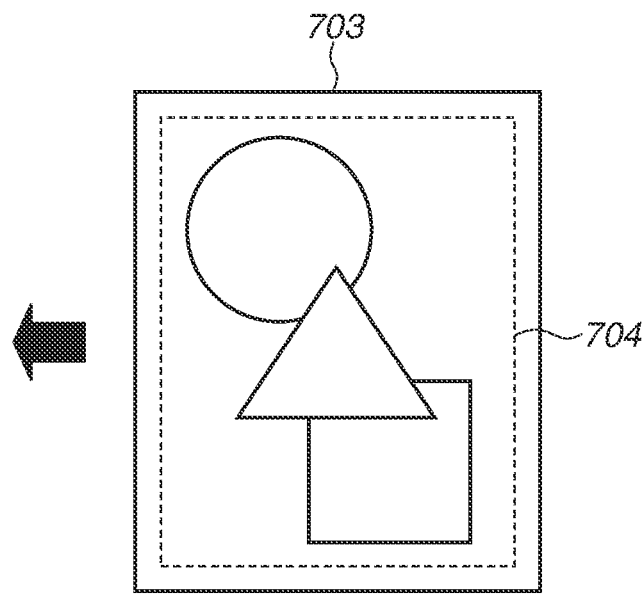

FIGS. 7A, 7B, and 7C are diagrams illustrating a relationship between a margin-deleted input image and a sheet size. The image forming apparatus 101 receives rasterized image data from the external controller 102 via the video cable 106. An image forming apparatus used in a printing system configured so that an external controller is connected is often a high-speed machine, and an input speed of image data can affect the throughput of the printing system. Thus, to reduce the data size of the image data as much as possible, there is an external controller 102 configured to delete the marginal image not expected to be printed by the image forming apparatus 101 and transmit the resulting image data to the image forming apparatus 101. More specifically, such an external controller 102 transmits only an image inside the broken line 602 of FIG. 6 to the image forming apparatus 101 as the image data.

FIG. 7A illustrates an example of image data on a margin-deleted image. FIG. 7B illustrates a sheet size 702 that is the A4 sheet size of a sheet to be actually printed. An image 701 of the image data received from the external controller 102 falls within the broken line 602 of FIG. 6, i.e., is smaller than the A4 sheet size. The CPU 222 reserves memory as much as the A4 sheet size in the memory 223, and generates an image of A4 sheet size by laying out the image data corresponding to the image 701 at the center. The image forming apparatus 101 prints the laid-out A4-size image to produce a print output illustrated in FIG. 7C. A print product 703 is an A4 sheet, and the image data on the image 701 is centered and printed in an area 704. In the present exemplary embodiment, the image 701 is printed at the center since the top, bottom, left, and right margins have the same widths. However, if the margins are uneven, the image 701 may be printed off the center based on the margins.

Figure 8A:
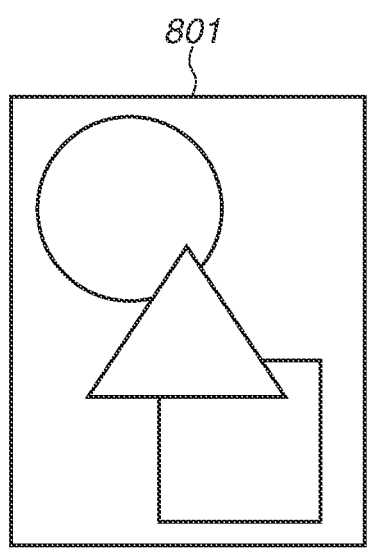
FIGS. 8A, 8B, and 8C are diagrams illustrating a relationship between an input image and a sheet size when the specified sheet size is different from the size of the input image.
Figure 8B:
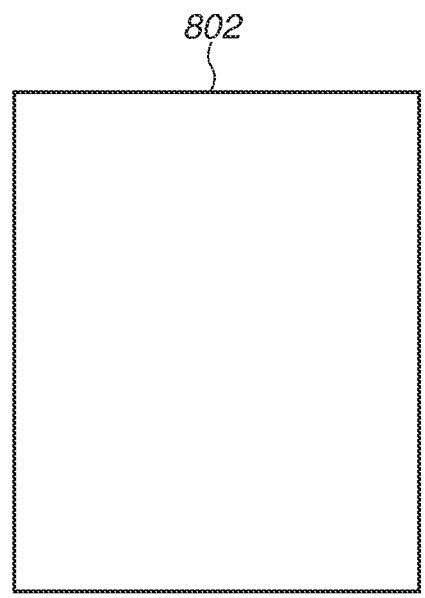
Figure 8C:
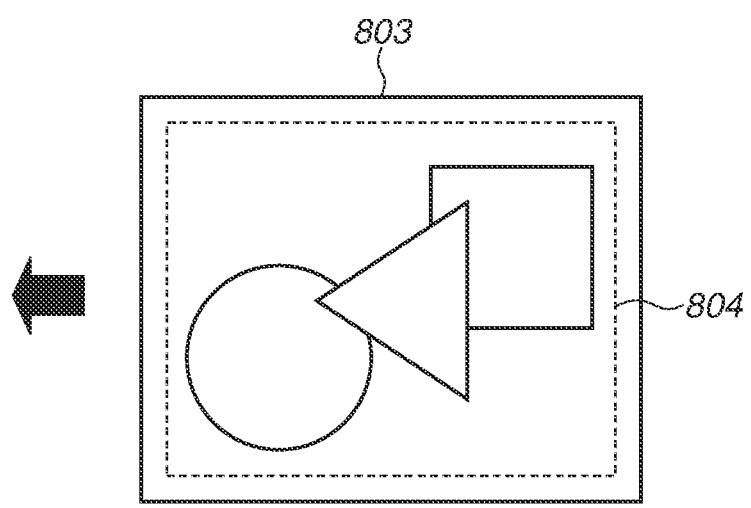

FIGS. 8A, 8B, and 8C are diagrams illustrating a relationship between an input image and a sheet size when the specified sheet size is different from the input image size. As in FIGS. 7A, 7B, and 7C, FIG. 8A illustrates the image data received from the external controller 102, FIG. 8B illustrates the size of the sheet to be printed, and FIG. 8C illustrates the print output.

In FIGS. 8A, 8B, and 8C, marginal image data is not deleted from the image data received from the external controller 102.

FIGS. 8A, 8B, and 8C illustrate an example of printing image data having an aspect ratio different from that of the sheet size for the print output. A print job can specify a sheet to be printed image by image, and a sheet size different from the image size can be specified. A sheet size 802 is the A3 sheet size, and an image 801 having an aspect ratio different from that of the A3 sheet size is printed on the sheet.

The CPU 222 reserves memory as much as the A3 sheet size in the memory 223, and generates an image of A3 sheet size by laying out the image data corresponding to the image 801 at the center. The image forming apparatus 101 can feed an A3 sheet only with a short side first, and thus the orientation of the sheet in printing is that of a print product 803, i.e., the sheet is fed in the direction of the arrow with the short side first.

Thus, the CPU 222 rotates the laid-out A3-size image data −90° and prints the rotated image data. As illustrated in FIG. 8C, the resulting print output is a landscape A3 sheet on which the rotated image data on the image 801 is printed at the center as represented by an image 804. It will be understood that the image 804 may be laid out close to a side instead of at the center.

FIG. 9 is a flowchart illustrating a procedure for generating layout information and registering reference images. The program of the printing apparatus 107 related to the flowchart is stored in the HDD 221, loaded into the memory 223, and executed by the CPU 222.

In step S901, the printing apparatus 107 reads page data on the print job. The page data includes the image data and information about the image size of the page, the sheet size of the sheet to be printed, resolution, and image orientation.

In step S902, the printing apparatus 107 compares the long side of the image size in the page data read in step S901 with that of the sheet size and the short side of the image size with that of the sheet size, and determines whether the image size and the sheet size are the same.

If the image size and the sheet size are the same (YES in step S902), the processing proceeds to step S905. If the image size and the sheet size are different (NO in step S902), the processing proceeds to step S903. In step S903, the printing apparatus 107 determines whether to rotate the image to fit the sheet based on whether the image data is portrait or landscape with respect to the sheet that is portrait. With the sheet portrait, the printing apparatus 107 determines to rotate the image if the image data is landscape.

Figure 10A:
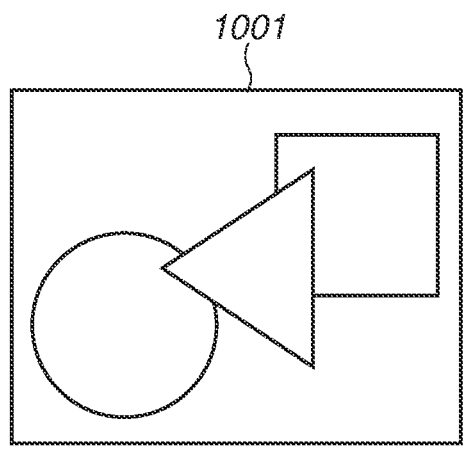
FIGS. 10A, 10B, and 10C are diagrams illustrating a difference between orientations of image data and a sheet, and layout offsets.
Figure 10B:
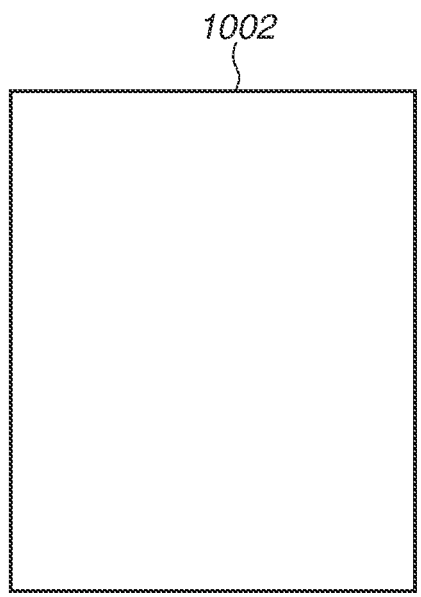
Figure 10C:
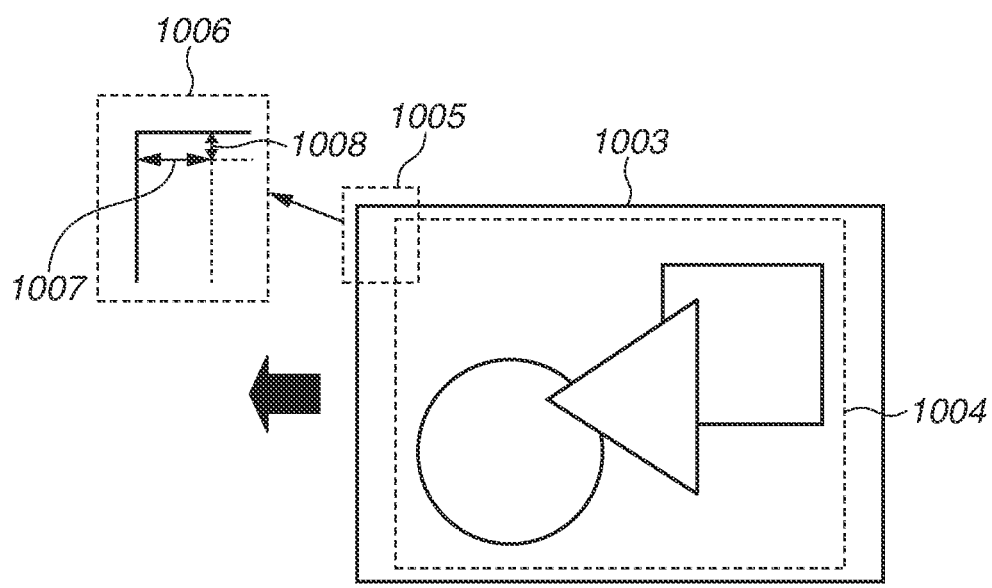

A specific example will be described with reference to FIGS. 10A, 10B, and 10C. FIG. 10A illustrates image data, and FIG. 10B illustrates a sheet size. In the illustrated example, a landscape image 1001 and a portrait sheet 1002 are 90° different in orientation. In the case of FIGS. 10A and 10B, the landscape image 1001 is rotated 90° to fit the portrait sheet 1002. In step S903, if the printing apparatus 107 determines to rotate the image (YES in step S903), the processing proceeds to step S904. If the printing apparatus 107 determines to not rotate the image (NO in step S903), the processing proceeds to step S905.

In step S904, the printing apparatus 107 determines the rotation angle of the image with respect to the sheet. In step S905, the printing apparatus 107 determines an image orientation in which the image data is actually printed. The sheet size refers to that of a portrait sheet. If, for example, an A3 sheet is used as illustrated in FIGS. 8A, 8B, and 8C, the printing apparatus 107 determines to rotate the image since the A3 sheet can be fed only with a short side first.

If finishing such as stapling or punching is intended, since the finishing can be performed only in a certain direction due to mechanical configurations, the orientation of the image to be printed is matched with the orientation of the sheet for the finishing. The printing apparatus 107 finally determines the orientation of the image to be printed on the sheet with the finishing taken into account, and determines the final rotation angle of the image data by also taking into account the rotation angle determined in step S903.

In step S906, the printing apparatus 107 calculates the position to locate and print the image at on the sheet in laying out the image on the sheet. In the present exemplary embodiment, as described with reference to FIGS. 7A, 7B, 7C, 8A, 8B, and 8C, the image data is laid out at the center of the sheet. It will be understood that the image data may be laid out close to a side of the sheet instead of at the center. A specific example will be described with reference to FIG. 10C. In FIG. 10C, an image 1004 is laid out at the center of a sheet 1003 because the image 1001 and the sheet 1002 are different in orientation and the image 1001 is thus rotated with respect to the sheet 1002 and because the sheet size and the image size are different.

If deviations between the sheet and the image are passed to the inspection apparatus 109 in advance along with the image data, the inspection apparatus 109 can determine which position to make a comparison at on a sheet scanned during inspection. Because the deviations are intended only to uniquely determine a positional relationship between the sheet and the image, offsets from sheet edges can be derived as the deviations. For example, an offset (position information) 1007 from the left edge of the sheet to the image in an X direction and an offset (position information) 1008 from the top edge of the sheet to the image in a Y direction are derived as the deviations.

In the present exemplary embodiment, the image is laid out at the center of the sheet. Thus, the offset in each of the X and Y directions is derived by (sheet size−image size)/2. The final rotation angle determined in step S905, the offsets (position information) from the sheet edges to the image determined in step S906, and a print side setting as to which side of the sheet to print the image on will hereinafter be referred to collectively as layout information.

In step S907, the printing apparatus 107 transmits the image data of which the layout processing is executed (image data laid out on the sheet) and the layout information (at least offset information) to the inspection apparatus 109 via the communication cable 254. The inspection apparatus 109 registers the image data of which the layout processing is executed in the memory 239 as a reference image, and stores the layout information (at least offset information) as relevant information.

In step S908, the printing apparatus 107 determines whether the page processed in steps S901 to S907 is the last page. If the page is not the last page (NO in step S908), the processing proceeds to step S901. If the page is the last page (YES in step S908), the processing ends.

Figure 11:
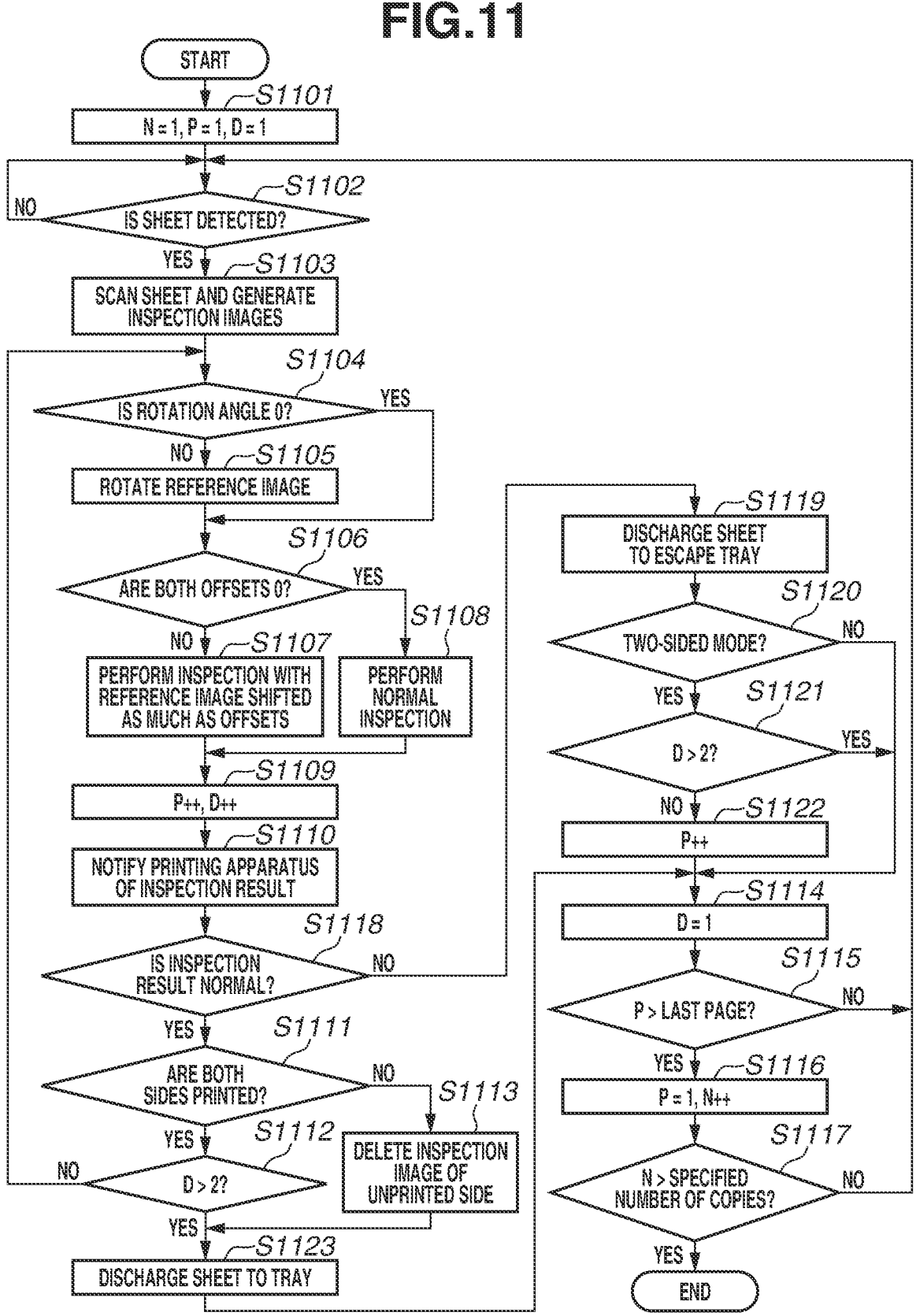
FIG. 11 is a flowchart illustrating a processing procedure during inspection by an inspection apparatus.

FIG. 11 is a flowchart illustrating a processing procedure during inspection by the inspection apparatus 109. The program of the inspection apparatus 109 related to the flowchart is executed by the CPU 238.

If a print job to be inspected is started, then in step S1101, the inspection apparatus 109 initializes variables to be used in the flowchart. The processing proceeds to step S1102.

The variables to be initialized include the number of copies N, a page number P, and the number of sides D. The inspection apparatus 109 initializes each of the variables to 1. In step S102, the inspection apparatus 109 waits for a printed sheet to be conveyed to the sheet conveyance path 333. If a sensor 334 upstream of the sheet conveyance path 333 detects a sheet (YES in step S1102), the processing proceeds to step S1103. In step S1103, the inspection apparatus 109 scans the sheet using the cameras 331 and 332 after a lapse of a predetermined time from the detection of the sheet by the sensor 334. The sheet is thereby scanned from the leading edge in the conveyance direction, and inspection images are generated. In the present exemplary embodiment, both sides of the sheet are scanned using the cameras 331 and 332 regardless of whether the sheet is printed on one side or both sides.

In step S1104, the inspection apparatus 109 reads the rotation angle (final rotation angle) from the layout information stored in the memory 239, along with the reference image. If the rotation angle is not 0° (NO in step S1104), the processing proceeds to step S1105 for image rotation. If the rotation angle is 0° (YES in step S1104), the processing proceeds to step S1106. In step S1105, the inspection apparatus 109 rotates the reference image as much as the rotation angle.

Figure 12A:
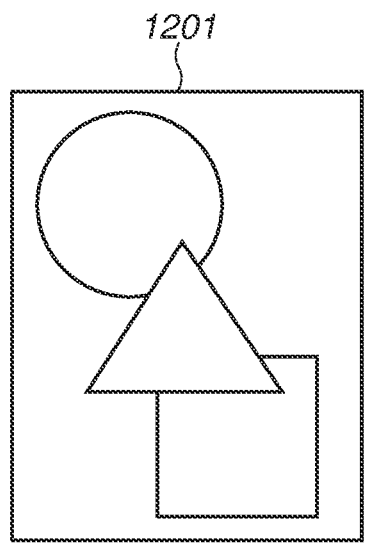
FIGS. 12A, 12B, and 12C are diagrams illustrating rotation of a reference image and an inspection position of an inspection image.
Figure 12B:
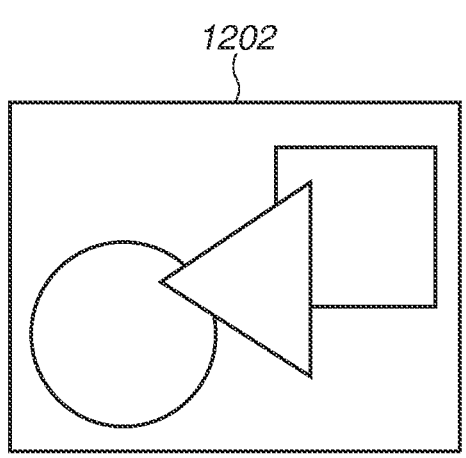

For example, FIG. 12A illustrates a reference image 1201. FIG. 12B illustrates a rotated reference image 1202, where the rotation angle is −90°.

In step S1106, the inspection apparatus 109 reads the offsets from the sheet edges included in the layout information stored in the memory 239, and determines whether both of the offsets in the X and Y directions are 0. If both of the offsets are 0 (YES in step S1106), the processing proceeds to step S1108 since the inspection position of the image does not need to be adjusted. If either of the offsets in the X and Y directions is not 0 (NO in step S1106), the processing proceeds to step S1107.

Figure 12C:
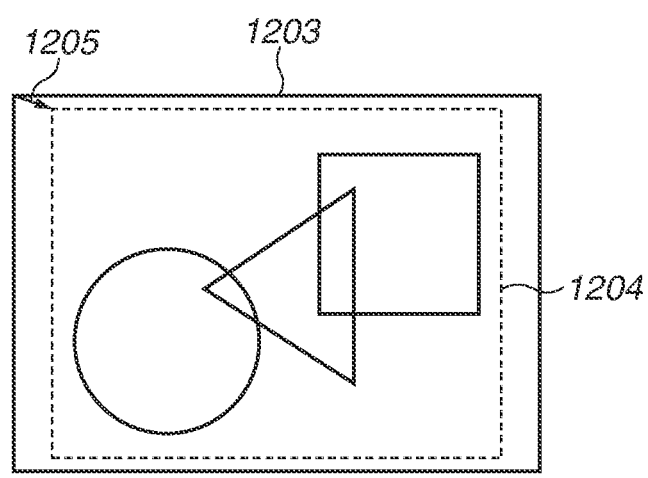

In step S1107, as illustrated in FIG. 12C, the inspection apparatus 109 inspects the inspection image with the reference image shifted with respect to the inspection image as much as the offsets since the inspection image scanned in step S1103 and the reference image have different sizes. In step S1108, the inspection apparatus 109 performs normal inspection since the inspection image and the reference image have the same image size. In step S1109, the inspection apparatus 109 increments the page number P and the number of sides D by one each.

In step S1110, the inspection apparatus 109 notifies the printing apparatus 107 of the inspection result. The processing proceeds to step S1118. In step S1118, if the inspection result is normal (YES in step S1118), the processing proceeds to step S1111. If the inspection result is abnormal (NO in step S118), the processing proceeds to step S1119. In step S1119, the printing apparatus 107 performs processing based on the inspection result. Examples of such processing include instructing the large-capacity stacker 110 to discharge the sheet to the escape tray 346 (tray on which print products with the abnormal inspection results are stacked) and suspending printing. After step S1119, the processing proceeds to step S1120.

In step S1120, the inspection apparatus 109 determines whether the image formation mode is the two-sided mode. If the image formation mode is not the two-sided mode (NO in step S1120), the processing proceeds to step S1114. If the image formation mode is the two-sided mode (YES in step S1120), the processing proceeds to step S1121. In step S1121, the inspection apparatus 109 determines whether both sides have been inspected based on the number of sides D. In step S1121, if the inspection apparatus 109 determines that both sides have been inspected (D>2) (YES in step S1121), the processing proceeds to step S1114. If both sides have not been inspected (D≤2) (NO in step S1121), the processing proceeds to step S1122. In step S1122, the inspection apparatus 109 increments the page number P by one. The processing proceeds to step S1114.

In step S1111, the inspection apparatus 109 determines whether both sides of the inspected sheet are printed. If both sides are printed (YES in step S1111), the processing proceeds to step S1112. If only one side of the inspected sheet is printed (NO in step S1111), the processing proceeds to step S1113. In step S1112, the inspection apparatus 109 determines whether both sides have been inspected based on the number of sides D. If inspection has been completed of both sides (D>2) (YES in step S1112), the processing proceeds to step S1123. If both sides have not been inspected (D≤2) (NO in step S1112), the processing proceeds to step S1104 to inspect the other side.

In step S11113, the inspection apparatus 109 deletes the inspection image of the unprinted side since only one side of the sheet is printed.

In step S1123, the inspection apparatus 109 discharges the sheet of which the inspection result is normal to a tray (tray on which print products with the normal inspection results are stacked). In step S1114, the inspection apparatus 109 initializes the number of sides D to 1.

In step S1115, the inspection apparatus 109 checks the page number P to determine whether inspection has been completed up to the last page. If the inspection has been completed up to the last page (YES in step S1115), the processing proceeds to step S1116. If the inspection has not been completed up to the last page (NO in step S1115), the processing proceeds to step S1102.

In step S1116, the inspection apparatus 109 initializes the page number P to 1 and increments the number of copies N since one copy has been printed. In step S1117, the inspection apparatus 109 checks the number of copies N to determine whether the specified number of copies have all been inspected. If the specified number of copies have not been inspected (NO in step S1117) the processing proceeds to step S1102. If the specified number of copies have all been inspected (YES in step S1117), the processing ends.

FIGS. 12A, 12B, and 12C are diagrams illustrating rotation of a reference image and an inspection position of an inspection image.

FIG. 12A illustrates an example of a reference image registered in the memory 239. Suppose, for example, that the reference image 1201 is a portrait A3 image. FIG. 12B illustrates an image that is the reference image 1201 rotated −90°. The rotated reference image 1202 is used for inspection, for example.

FIG. 12C illustrates an inspection image. Since the reference image 1202 is only as large as a broken-lined frame 1204 in an inspection image 1203, the inspection image 1203 is inspected by comparison with the reference image 1202 with an offset illustrated by an arrow 1205 from the top left of the inspection image 1203. This enables inspection at a proper position.

According to the configuration of the present exemplary embodiment, if the image size and the sheet size of a print job are different, layout information including the rotation angles of images and offsets from sheet edges can be registered in the inspection apparatus 109 along with reference images in consideration of the layout on the sheet during printing. Moreover, proper inspection can be made by adjusting the rotation and comparison positions of the reference images during inspection. In the present exemplary embodiment, the image size is described to be smaller than the sheet size. It will be understood, however, that if the image size is larger than the sheet size, proper inspection can be made by generating the reference images in the same layout as during printing.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-066689, filed Apr. 9, 2021, which is hereby incorporated by reference herein in its entirety.

What is claimed is:

1. An image forming apparatus comprising:
a printer configured to print image data on a printing medium;
a storage; and
a controller configured to:
inspect the printing medium by comparing reference image data with a scanned image which is obtained by reading of the printing medium on which an image is printed;
execute layout processing of the image data on the printing medium based on a size of the printing medium and an image size of the image data;
acquire offset information in the layout processing of the image data on the printing medium; and
store the image data of which the layout processing is executed and the offset information in the storage,
wherein the controller determines a position of a reference image corresponding to a position of the scanned image by using the offset information when the controller compares the reference image data with the scanned image, and
wherein the controller is configured to compare the reference image with the scanned image on a basis of a method which is different depending on whether the offset information is zero or not.

2. The image forming apparatus according to claim 1, wherein the offset information is position information about a position of the image data from an edge of the printing medium.

3. The image forming apparatus according to claim 2, wherein the position information includes position information about a position of the image data from an edge of the printing medium in an X direction, and position information about a position of the image data from an edge of the printing medium in a Y direction.

4. The image forming apparatus according to claim 1, wherein the layout processing includes laying out the image data at a center of the printing medium.

5. The image forming apparatus according to claim 1, wherein the layout processing includes comparing the size of the printing medium with the image size of the image data and, in a case where the size of the printing medium and the image size are different, rotating the image data.

6. The image forming apparatus according to claim 1, wherein the storage is configured to, in a case where the printer prints image data on a plurality of pages on printing media, store the offset information page by page.

7. The image forming apparatus according to claim 1, wherein the controller inspects the printing medium on which the image data is printed by comparing the position of the scanned image and the position of the reference image determined by using the offset information.

8. The image forming apparatus according to claim 1, wherein the controller is configured to, in a case where the offset information is zero, compare the entire image data of which the layout processing is executed with the entire image data generated and, in a case where the offset information is not zero, compare part of the image data of which the layout processing is executed within a range based on the offset information with part of the generated image data within the range based on the offset information.

9. An image forming system comprising:
a printing apparatus configured to print image data on a printing medium; and
a control apparatus configured to:
inspect the printing medium by comparing reference image data with a scanned image which is obtained by reading of the printing medium on which an image is printed;
execute layout processing of the image data on the printing medium based on a size of the printing medium and an image size of the image data;
acquire offset information in the layout processing of the image data on the printing medium; and
store the image data of which the layout processing is executed and the offset information,
wherein the control apparatus determines a position of a reference image corresponding to a position of the scanned image by using the offset information when the control apparatus compares the reference image data with the scanned image, and
wherein the control apparatus is configured to compare the reference image with the scanned image on a basis of a method which is different depending on whether the offset information is zero or not.

10. The image forming system according to claim 9, wherein the offset information is position information about a position of the image data from an edge of the printing medium.

11. The image forming system according to claim 10, wherein the position information includes position information about a position of the image data from an edge of the printing medium in an X direction, and position information about a position of the image data from an edge of the printing medium in a Y direction.

12. The image forming system according to claim 9, wherein the layout processing includes laying out the image data at a center of the printing medium.

13. The image forming system according to claim 9, wherein the layout processing includes comparing the size of the printing medium with the image size of the image data and, in a case where the size of the printing medium and the image size are different, rotating the image data.

14. The image forming system according to claim 9, wherein, in a case where the printing apparatus prints image data on a plurality of pages on printing media, the offset information is stored page by page.

15. The image forming system according to claim 9, wherein the control apparatus is configured to, in a case where the offset information is zero, compare the entire image data of which the layout processing is executed with the entire image data generated and, in a case where the offset information is not zero, compare part of the image data of which the layout processing is executed within a range based on the offset information with part of the generated image data within the range based on the offset information.

16. An image forming apparatus comprising:
a printer configured to print image data on a printing medium;
a scanner configured to read a sheet and generate image data;
a storage; and
a controller configured to:
inspect the printing medium by comparing reference image data with a scanned image which is obtained by reading of the printing medium on which an image is printed;
execute layout processing of the image data on the printing medium based on a size of the printing medium and an image size of the image data;
acquire offset information in the layout processing of the image data on the printing medium; and
store the image data of which the layout processing is executed and the offset information in the storage,
wherein the controller determines a position of a reference image corresponding to a position of the scanned image by using the offset information when the controller compares the reference image data with the scanned image,
wherein the controller is configured to compare the image data of which the layout processing is executed, the image data being stored in the storage, with the image data generated by the scanner based on the offset information, and
wherein the controller is configured to, in a case where the offset information is zero, compare the entire image data of which the layout processing is executed with the entire image data generated.

17. The image forming apparatus according to claim 16, wherein the controller is configured to, in a case where the offset information is not zero, compare part of the image data of which the layout processing is executed within a range based on the offset information with part of the generated image data within the range based on the offset information.

18. An image forming system comprising:
a printing apparatus configured to print image data on a printing medium;
a reading apparatus configured to read a sheet and generate image data; and
a control apparatus configured to:
inspect the printing medium by comparing reference image data with a scanned image which is obtained by reading of the printing medium on which an image is printed;
execute layout processing of the image data on the printing medium based on a size of the printing medium and an image size of the image data;
acquire offset information in the layout processing of the image data on the printing medium; and
store the image data of which the layout processing is executed and the offset information,
wherein the control apparatus determines a position of a reference image corresponding to a position of the scanned image by using the offset information when the control apparatus compares the reference image data with the scanned image,
wherein the stored image data of which the layout processing is executed is compared with the image data generated by the reading apparatus based on the offset information, and
wherein, in a case where the offset information is zero, the entire image data of which the layout processing is executed is compared with the entire image data generated.

19. The image forming system according to claim 18, wherein, in a case where the offset information is not zero, part of the image data of which the layout processing is executed within a range based on the offset information is compared with part of the generated image data within the range based on the offset information.

\* \* \* \* \*